United States Patent
Basson et al.

(10) Patent No.: US 10,362,060 B2
(45) Date of Patent: Jul. 23, 2019

(54) CURTAILING SEARCH ENGINES FROM OBTAINING AND CONTROLLING INFORMATION

(71) Applicant: International Business Machines Corporation, Yorktown Heighs, NY (US)

(72) Inventors: Sara H Basson, White Plains, NY (US); Robert George Farrell, Cornwall, NY (US); Dimitri Kanevsky, Ossining, NY (US); Sophia Krasikov, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 14/984,900

(22) Filed: Dec. 30, 2015

(65) Prior Publication Data

US 2017/0195365 A1    Jul. 6, 2017

(51) Int. Cl.
*H04L 29/06* (2006.01)
*G06F 16/951* (2019.01)
*H04W 12/02* (2009.01)

(52) U.S. Cl.
CPC ........... *H04L 63/20* (2013.01); *G06F 16/951* (2019.01); *H04L 63/0428* (2013.01); *H04W 12/02* (2013.01)

(58) Field of Classification Search
CPC ..... H04L 63/20; H04L 63/0428; G06F 17/30; G06F 7/00; G06F 21/6254; G06F 17/30864; G06F 17/30569; G06F 16/951; G06Q 30/06; G06Q 30/00; G06Q 30/0269; G06Q 30/0277; G06Q 30/0251; H04W 12/02

USPC .... 726/1; 707/607, 748, 759, 769, 706, 757; 709/224, 249; 713/177, 162, 168, 179, 713/182; 705/26.61, 14.49

See application file for complete search history.

(56) References Cited

U.S. PATENT DOCUMENTS

| | | | |
|---|---|---|---|
| 8,392,441 B1 | 3/2013 | Papachristou et al. | |
| 8,407,229 B2* | 3/2013 | Yang ................. | G06F 17/30864 707/748 |
| 8,918,359 B2* | 12/2014 | Ahuja ............... | G06F 17/30592 707/607 |
| 9,002,868 B2* | 4/2015 | Zurek ............... | G06F 17/30477 707/759 |
| 2010/0023509 A1 | 1/2010 | Adachi et al. | |
| 2011/0161176 A1 | 6/2011 | Chuan | |
| 2011/0208717 A1 | 8/2011 | Pierce | |

\* cited by examiner

*Primary Examiner* — Thanhnga B Truong
(74) *Attorney, Agent, or Firm* — Grant Johnson, Esq.; McGinn IP Law Group, PLLC (57) ABSTRACT

A system and method for concealing searches for information stored on public networks, includes intercepting a sensitive query to a search engine prior to transmission of the sensitive query over a public network, transforming the sensitive query into one or more related queries, submitting the related queries over the public network to the search engine, aggregating search results from the search engine, and performing a search on the original query with a search engine privately against said search results.

16 Claims, 9 Drawing Sheets

CURTAILING SEARCH ENGINES FROM OBTAINING AND CONTROLLING INFORMATION

BACKGROUND OF THE INVENTION

Field of the Invention

The disclosed invention relates generally to a system, apparatus and method for curtailing search engines from obtaining and controlling information, and more particularly, but not by way of limitation, relating to a system, apparatus and method for the protection of web search (and the underlying intent of that search) and to curtailing search engines' abilities to create "topics" based on users' searches.

Description of the Related Art

Currently with the increase use of searching tools, there is an ever increasing use or misuse of private or confidential information of users and systems that perform the search. The content of the search input and output could be misused.

Search engine track requests from users and statistically create "topics" of search. It is reflected in a search engine auto-complete feature. Because search engine algorithms are carefully protected, one may not be aware of whether the algorithms are "pure" statistical or they intentionally connect users with content likely to generate more clicks and in turn profits, or request strings are obtained, stored and being sold to a third party that might be any buyer such as a retailer, media organization, or a spying agency.

In a climate of increasingly monitored searches, there is a growing need for developing new approaches to search protection. There are various strategies from securing a search query by submitting a set of supplemental queries along with the original query (to mask it) to encrypting searches.

SUMMARY OF INVENTION

In view of the foregoing and other problems, disadvantages, and drawbacks of the aforementioned background art, an exemplary aspect of the disclosed invention provides a system, apparatus, and method of providing for system, apparatus and method for curtailing search engines from obtaining and controlling information.

One example aspect of the disclosed invention provides a method for concealing searches for information stored on public networks, includes intercepting a sensitive query to a search engine prior to transmission of the sensitive query over a public network, transforming the sensitive query into one or more related queries, submitting the related queries over the public network to the search engine, aggregating search results from the search engine, and performing a search on the original query with a search engine privately against said search results.

The intercepting the sensitive query is to a plurality of the search engines prior to transmission of the sensitive query over a plurality of the public networks, wherein the submitting of the related queries is over the plurality of the public networks to the plurality of the search engines, and aggregating the search results from the plurality of the search engines.

The search results are stored in a computer readable medium. There are two or more related benign queries made to the search engine. The related queries are sent from at least one user who was not the searcher issuing said sensitive query. The related queries are issued from different addresses. The user issuing the search identifies the search as sensitive. The search is classified as sensitive automatically. The method can be implemented in a cloud computing environment.

Another example aspect of the disclosed invention provides search concealing system, including a memory, a processor coupled to the memory, and the memory and the processor configured to perform a method including intercepting a sensitive query to a search engine prior to transmission of the sensitive query over a public network, transforming the sensitive query into one or more related queries, submitting the related queries over the public network to the search engine, aggregating search results from the search engine, and performing a search on the original query with a search engine privately against said search results.

A computer program product comprising a computer readable storage medium having program instructions embodied therewith, the program instructions readable and executable by a computer to cause the computer to: intercepting a sensitive query to a search engine prior to transmission of the sensitive query over a public network, transforming the sensitive query into one or more related queries, submitting the related queries over the public network to the search engine, aggregating search results from the search engine, and performing a search on the original query with a search engine privately against said search results.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

The disclosed invention includes a method and system that allows users doing online searches to mask and keep private the specific search terms of their queries, or the nature and aims of the search itself. The disclosed invention helps to keep any number of human of electronic "observers" of an online search from being able to identify what precisely is being searched for.

The disclosed invention provides a more novel strategy that would involve "splitting" the search query, substituting parts of the original query so as to obscure the original query and searching the parts separately, so as to cast out many smaller obscured searches, then aggregating and re-combining the results of the obscured searches in a private environment so that a search can be performed on the full original search text inside of a protected system by using a local search engine.

Possible uses of such an invention would allow users to protect their ideas and areas of interest from being monitored by various entities, which could include: competing enterprises and businesses, unfriendly governments, or the owners of the search engines on which searches are being carried out.

Some examples of types of searches that need to be protected are:

1) Searching for Prior Art without providing a full search text that could lead to the unveiling of an idea that the searcher wants concealed from anybody who can track his search, such as competitors;

2) Searching for a social or commercial profile of an individual without disclosing a full name of the person of interest;

3) Searching for a product without revealing details that could identify what the product of interest is;

4) Searching for information on terrorist organizations by intelligence agencies;

5) Searching for a job on job postings, career guidance sites, etc. without revealing intentions to one's own employer;

6) Searching for information about oneself, searching one's profiles without disclosing one's own identity to those who maintain the information; and 7) Searching for details of financial transactions by companies without revealing the identity of the company or stock.

The disclosed invention provides a new way for protecting an online search. Disclosed is a method for splitting an original textual search query into related benign chunks of text and searching them separately. The result of the searches then are aggregated and re-combined and a search on the full original search text is performed inside of a protected system by using a local search engine.

Figure 1:
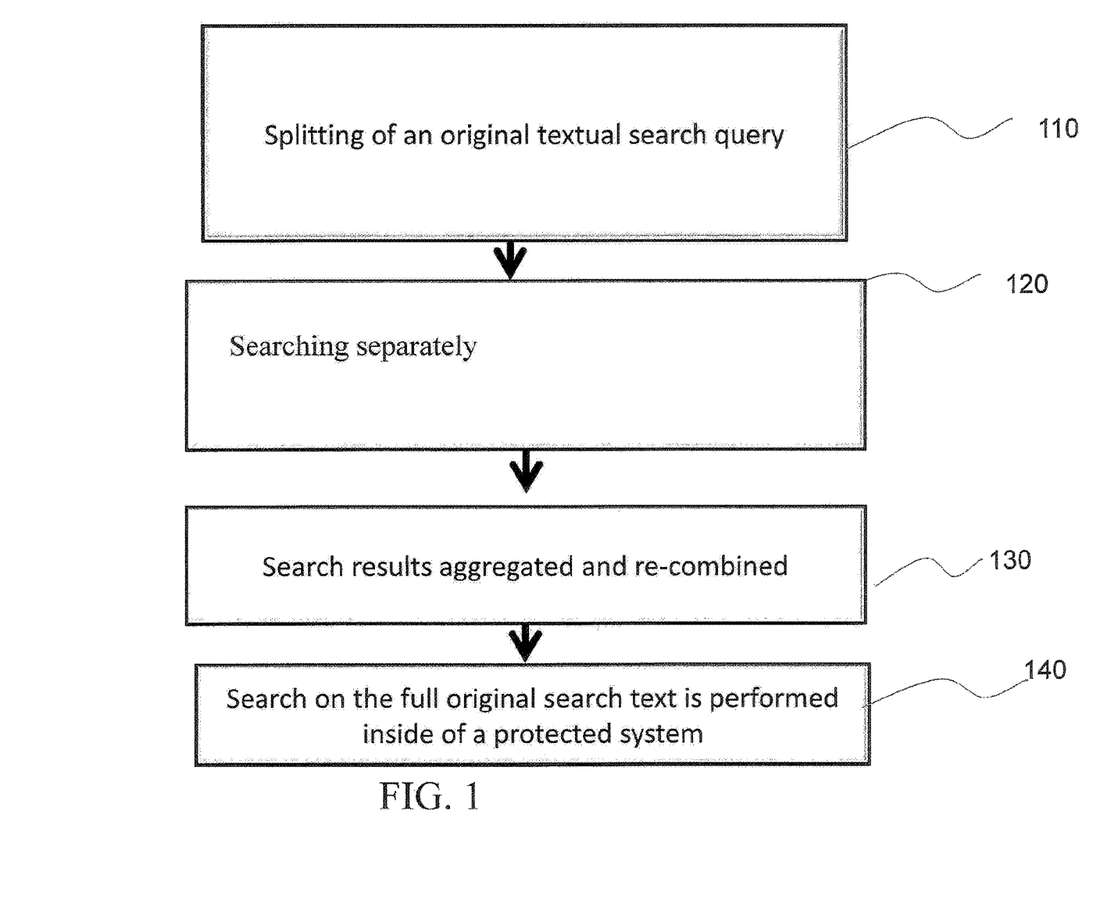
FIG. 1 illustrates a method for curtailing search engines from obtaining and controlling information in an example embodiment.

Referring to FIG. 1, first, there is a splitting of an original textual search query into related benign chunks of text (step 110) and the searching them separately (step 120). Then the result of the searches from step 120 then are aggregated and re-combined in step 130 and a search on the full original search text is performed inside of a protected system by using a local search engine in step 140.

Many variations of an application embodying this idea are possible. Chunks of the original query text could be transformed into a more detailed text for a search but still removed from the original query text. For example instead of searching an idea for 'heart cell cloning', a search might be performed for 'tissue cloning' and 'heart cell regeneration.'

Figure 2:
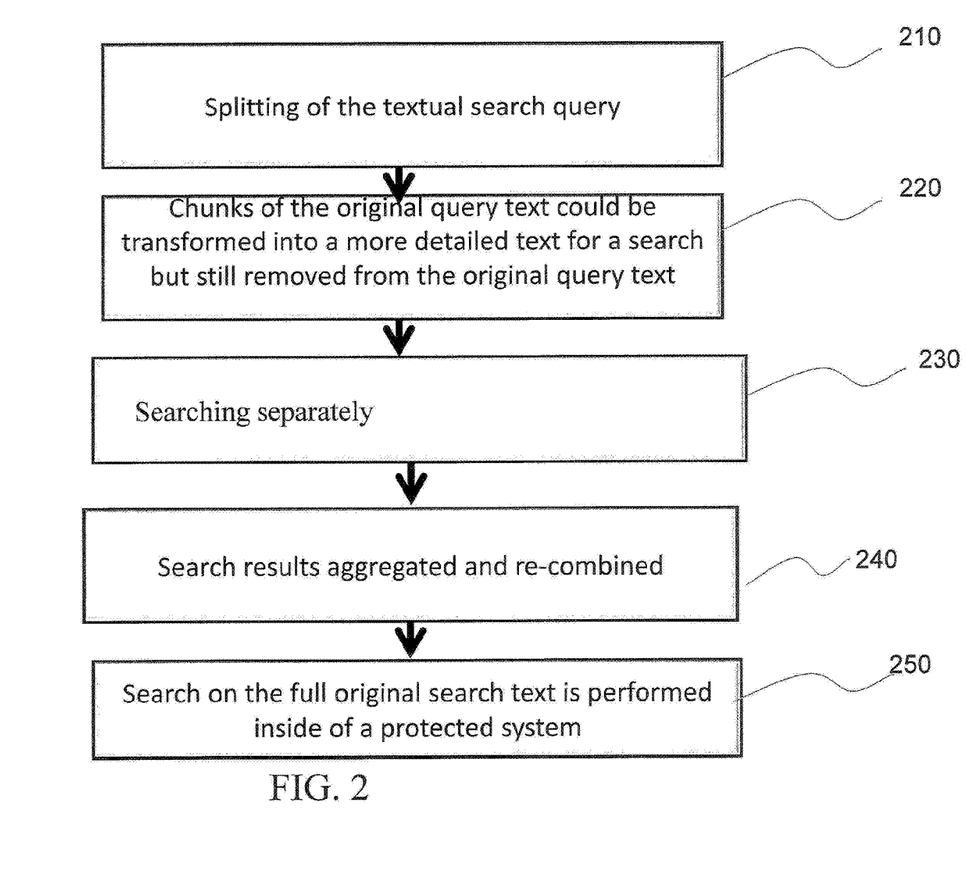
FIG. 2 illustrates further detail for curtailing search engines from obtaining and controlling information in an example embodiment.

Therefore, for example, referring to FIG. 2, there is a splitting of the original textual search query into related benign chunks of text (step 210). Then, the chunks of the original query text could be transformed into a more detailed text for a search but still removed from the original query text (step 220) and then searching them separately (step 230). Then the result of the searches from step 230 are then are aggregated and re-combined in step 240 and a search on the full original search text is performed inside of a protected system by using a local search engine in step 250.

Thus the disclosed method is obscuring the original query by generating "fuzzy" and "misleading" queries so that the generated queries might have or not have any word from the original query. Therefore, a novel technique for changing the query to obscure the search intent is shown.

More generally, the tool will split the intended search terms, perhaps augmenting, limiting, broadening, substituting, permuting, scrambling grammar and syntax, and filtering the categories of select sub-terms. The mass of data then is aggregated from one or more search engines will be collected in a protected environment and subjected to searches by a private search engine.

Some examples of types of privacy-enhancing query transformations are listed as follows:

Augmenting: Adding very common 'stop' words that are typically filtered out by search engines ('a', 'the', 'at', 'which', 'on');

Limiting: Removing words that most identify what is being searched for, such as proper names;

Broadening: Using a proper ontology to find super classes of terms, so the specific terms are not used;

Substituting: Using a thesaurus to generate synonymous words to hide exact wording; and Inserting: inserting an original request into a set of other requests to mask a user's intent. (e.g. inserting the extra terms like "tissue reconstruction", "smart cell" and "heart attack" to the intended search of "heart cell regeneration").

Another way of 'Inserting' could be done by 'Piggybacking', e.g. identifying similar prior art searches, and incorporating them in a query so as to mask the actual prior art search intended. Automatic technologies for generating "fake" search requests can be created.

Permuting includes permuting the order of the query, even without sending it to multiple search engines, could provide some amount of increased concealment of purpose. Scrambling grammar and syntax includes changing a grammatical sentence into an ungrammatical one e.g., by manipulating the parse tree.

Filtering includes identifying the context of the query, such as the web site where the search is being done. This could help to identify a search as 'sensitive', or alert the user whether it is prior art on GOOGLE patents, a product on AMAZON, or another kind of distinctive search entity.

Figure 3:
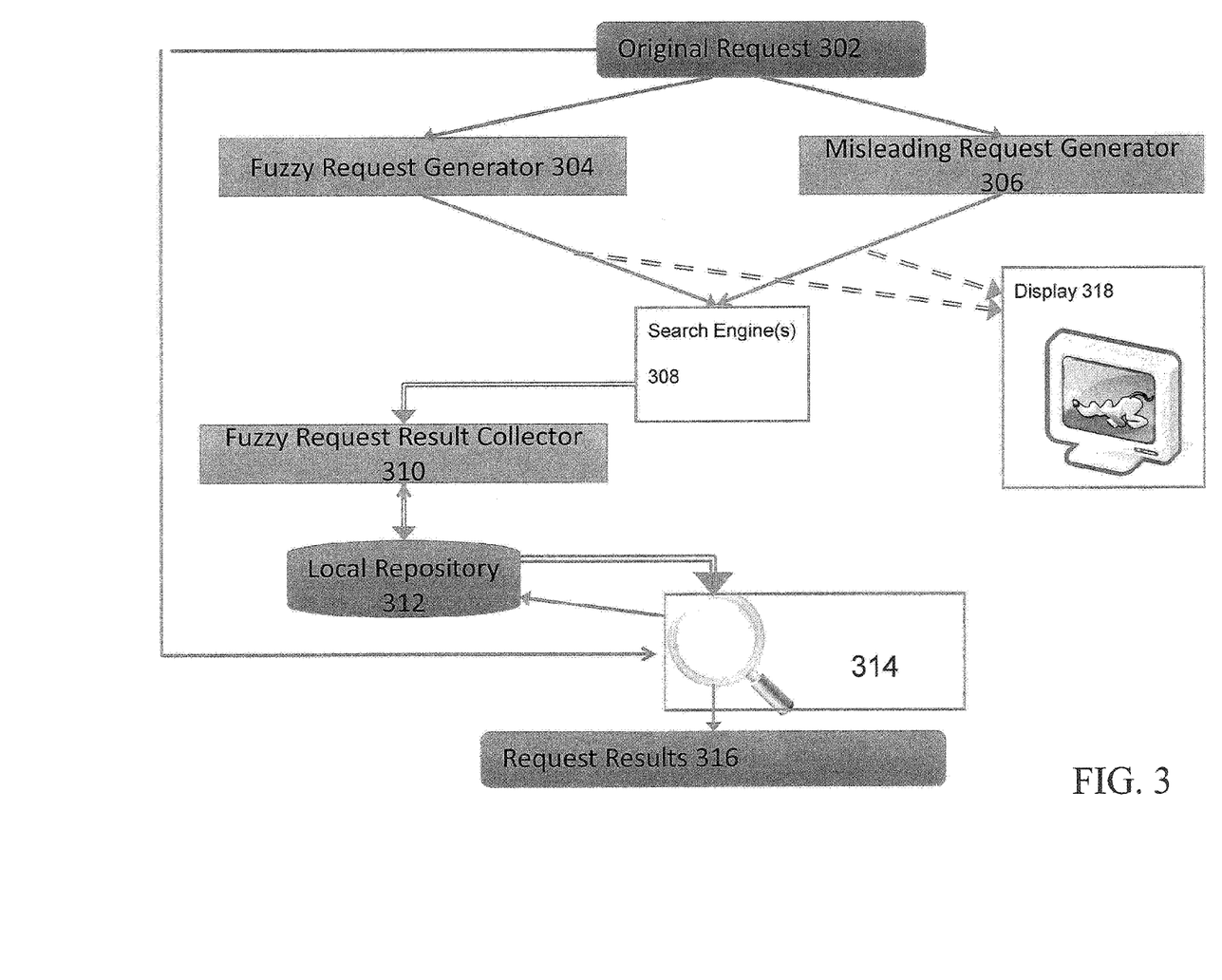
FIG. 3 illustrates a system of curtailing search engines from obtaining and controlling information in an example embodiment.

Referring to FIG. 3, there is illustrated a system of providing obscured (fuzzy and misleading) queries to one embodiment of the present invention.

The original request module 302 receives the original request from a user or a device or sensor or input device (other examples are also possible as input). The output is sent to the fuzzy generator 304 that provides a fuzzy output and a misleading request generator 306 that provides a misleading output. The original request 302 is also sent to the analyzer in 314. The fuzzy generator output and the misleading request output is sent to the search engine(s) 308. The fuzzy generator output and the misleading request output can also be displayed on display 318. The output from the search engines 308 is then sent to the fuzzy request result collector which collects the results.

The collected results are then sent to the local repository 312, which are analyzed in analyzer 314. The analyzer 314 can then output its results to the local repository 312 for further storage, and output to the request results module 316 for output to, for example, a display or another system or device.

Figure 4:
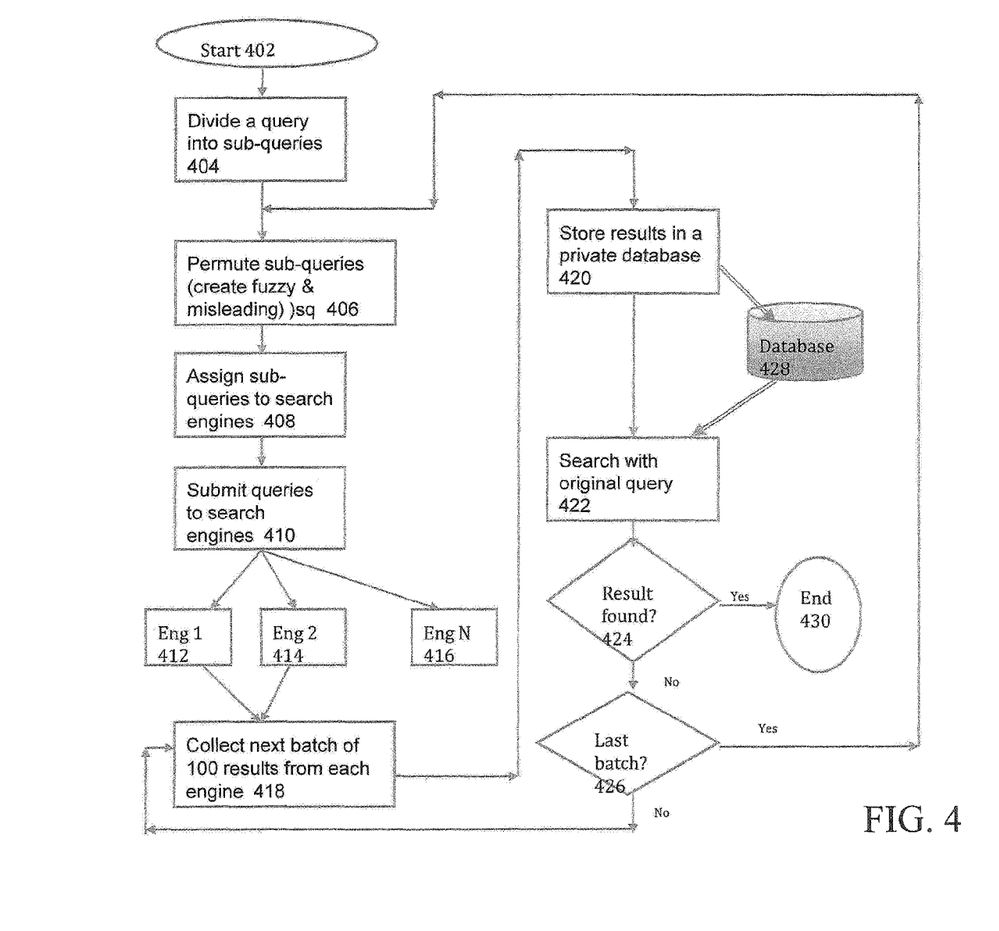
FIG. 4 a flow chart of curtailing search engines from obtaining and controlling information in an example embodiment.

Query processing component in an example embodiment of the disclosed invention can be as follows referring to FIG. 4. FIG. 4. illustrates the processing component in an example preferred embodiment.

The system starts in step 402, and then divide a query w into sub-queries: q1, q2, . . . qn in step 404. In an example embodiment, the system can use trigrams (3 terms in a row) plus leftover.

Then transform the query with an example to permute the sub-query "w" in step 406. The system creates fuzzy and misleading sub-queries.

The identify each of engines: m1, m2, . . . mn. (where n is an integer) (e.g., Engine 1 to Engine N, where N is an integer) and assign the sub-queries to the search engines in step 408. In step 410, the sub-queries are submitted to search engines Engine 1 (412), Engine 2 (414) to Engine N (416).

One search engine per sub-query is an example preferred embodiment.

In parallel, for each sub-query "q" and each search engine m (e.g., Engine 1 to Engine M) performs the following steps. First, in step 418, there is a collection of the next batch of 100 (example, as it could be another amount) results from each engine. First, there is a retrieval of the first N digital objects from the search engine m matching the sub-query "q". N=100 is an example embodiment. Then the system downloads each of the N digital objects.

Then in step 420 the system stores each digital object n in a private database D 428.

In the database 428, the system indexes the digital object and store term frequencies within the digital object. Then in step 422, the system runs the original query "w" on database D 428.

Then the system selects a corpus "C" suitable for query "q". The system then scores the private relevance of each digital object using corpus term frequencies. If nothing found, then download, store, and index the next group of N digital objects (4b, c, and d). Then run the query "w" again. Else return the search results from the private store.

For example, if no results are found from search in step 422, the system goes to step 426 to check it is the last batch. If results are found in step 424, then the method ends in 430. However, if it is determined that it is not the last batch 426, then the system reverts to collection of the next batch of 100 results from each engine in step 418. Otherwise, if it is determined to be the last batch in step 426, then the system permutes the sub-queries in step 406.

Example issues to consider are the following. There is a tradeoff between shorter sub-queries, which reveal less, and longer sub-queries that provide results closer to the original query. The search will be slower than running the original search because more sub-searches are performed and must be downloaded and indexed.

In principle, the eavesdropper can monitor all parallel split search requests from the same person or same id (especially if sub-query searches are done serially) and infer what the true search is supposed to be by integrating separate search requests into one. To prevent this, a preferred embodiment can allow users to request searches for various "split" parts of their original search request under different names. For example, 'tissue cloning' is done under the name Peter and 'heart cell regeneration' under the name Alex. The searches can also be done at different times, and using different IP addresses (if routed through a VPN service, such as HMA, or the TOR network (torproject.org) via a browser like ONION, or DUCDUCKGO. If sub-query searches originate from the same address, it may be easier for an observer to learn the full queries. Doing sub-queries from several different addresses, or using multiple identities, mitigates the problem.

In a preferred embodiment a user interface could be provided to review and approve sub-queries; users could be made aware of the perils of their queries being public by providing examples of how the information could be used.

Two issues of a preferred embodiment should also be emphasized—corpus term frequencies and integrating relevance rating.

Corpus Term Frequencies

With the preferred ranking method, the private store has an index created from a suitable corpus. For example, for news articles, the NEW YORK TIMES corpus could be used. In this way, term frequencies on retrieved documents can be combined with inverse document frequency from the corpus.

Integrating Relevance Ranking

Some search engines make use of link structures, popularity, or other measures. One can leverage the relevance rankings of the search engines on the sub-queries that incorporate these aspects; it is also possible to utilize these same properties on searches against the private store. This would provide a localized relevance score.

It is noted that search queries need not be textual. The methods of the disclosed invention could be used in cases where search queries may be performed using "query by example". In this case, we may want to protect the example or the general topic of the example being searched. In alternate embodiments, parts of the query could be parts of an image, audio, or video. Examples of multimedia searches in need of protection include:

1) Searching for a particular satellite image so as not to reveal the particular place of interest;
2) Searching for a video of a racehorse so as not to reveal the identity or class of the racehorse and change the odds of the horse in the race; and
3) Searching for a song so as not to reveal the particular song or genre of interest.

Image searches could be obscured by searching adjacent areas, video searches by searching before or after the sequence of interest, and audio searches by including other parts of the audio. Additional methods may be used to modify the images or audio.

Exemplary Hardware and Cloud Implementation

Figure 5:
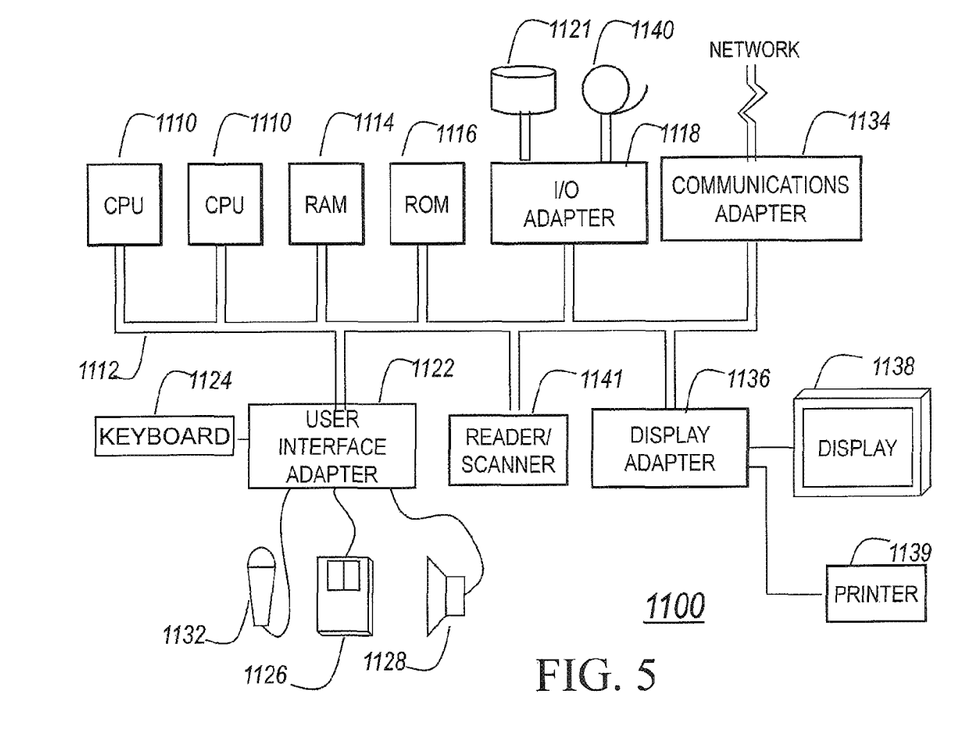
FIG. 5 illustrates an exemplary hardware/information handling system for incorporating the exemplary embodiment of the invention therein.

FIG. 5 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 6), directly or indirectly accessible by the CPU 1210.

Figure 6:
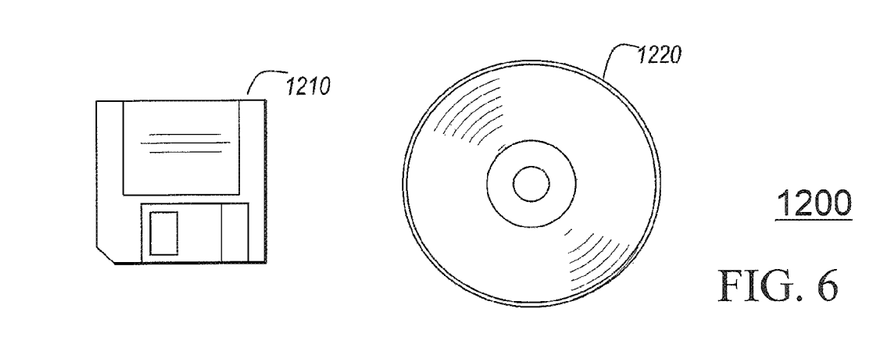
FIG. 6 illustrates a signal-bearing storage medium for storing machine-readable instructions of a program that implements the method according to the exemplary embodiment of the invention.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
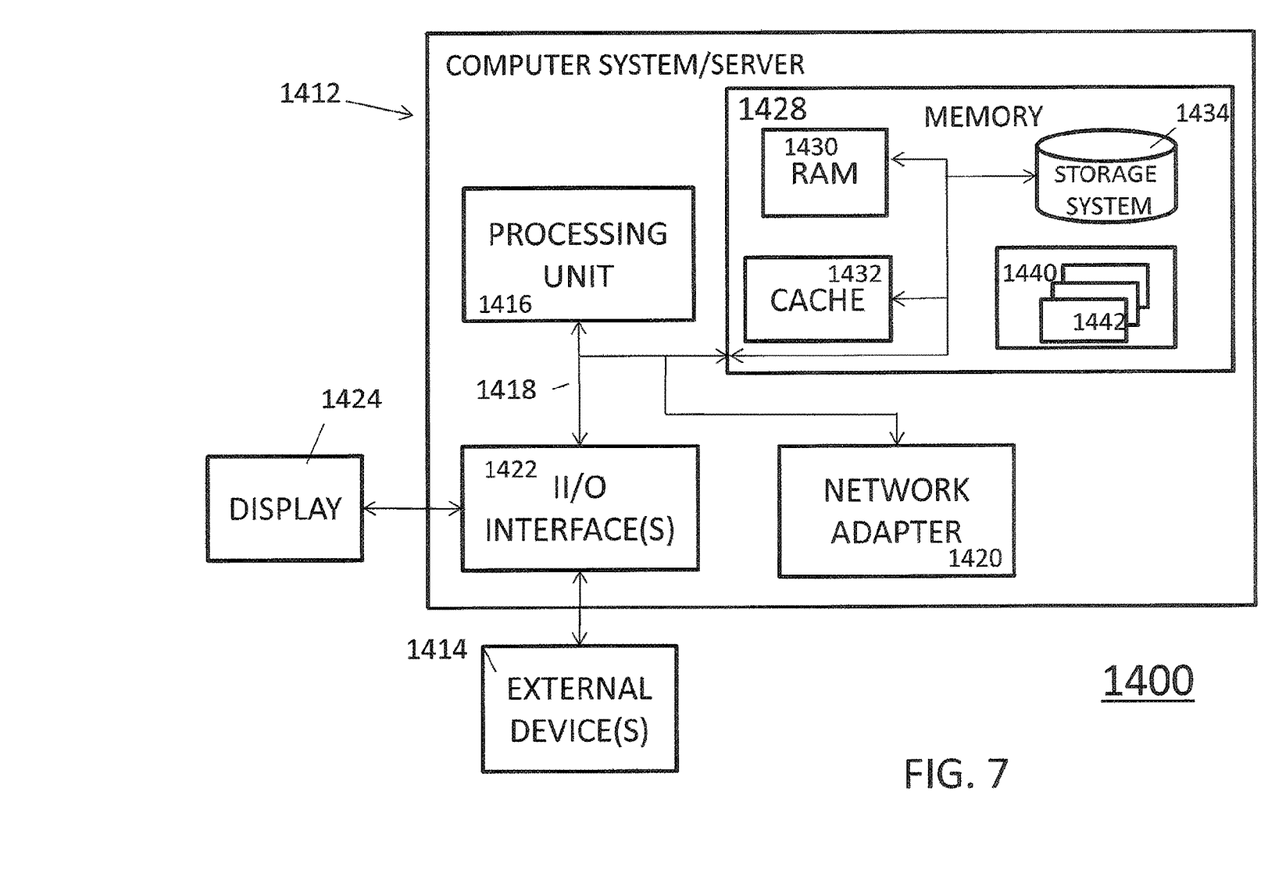
FIG. 7 depicts a cloud computing node according to an embodiment of the present invention.

Referring now to FIG. 7, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 8:
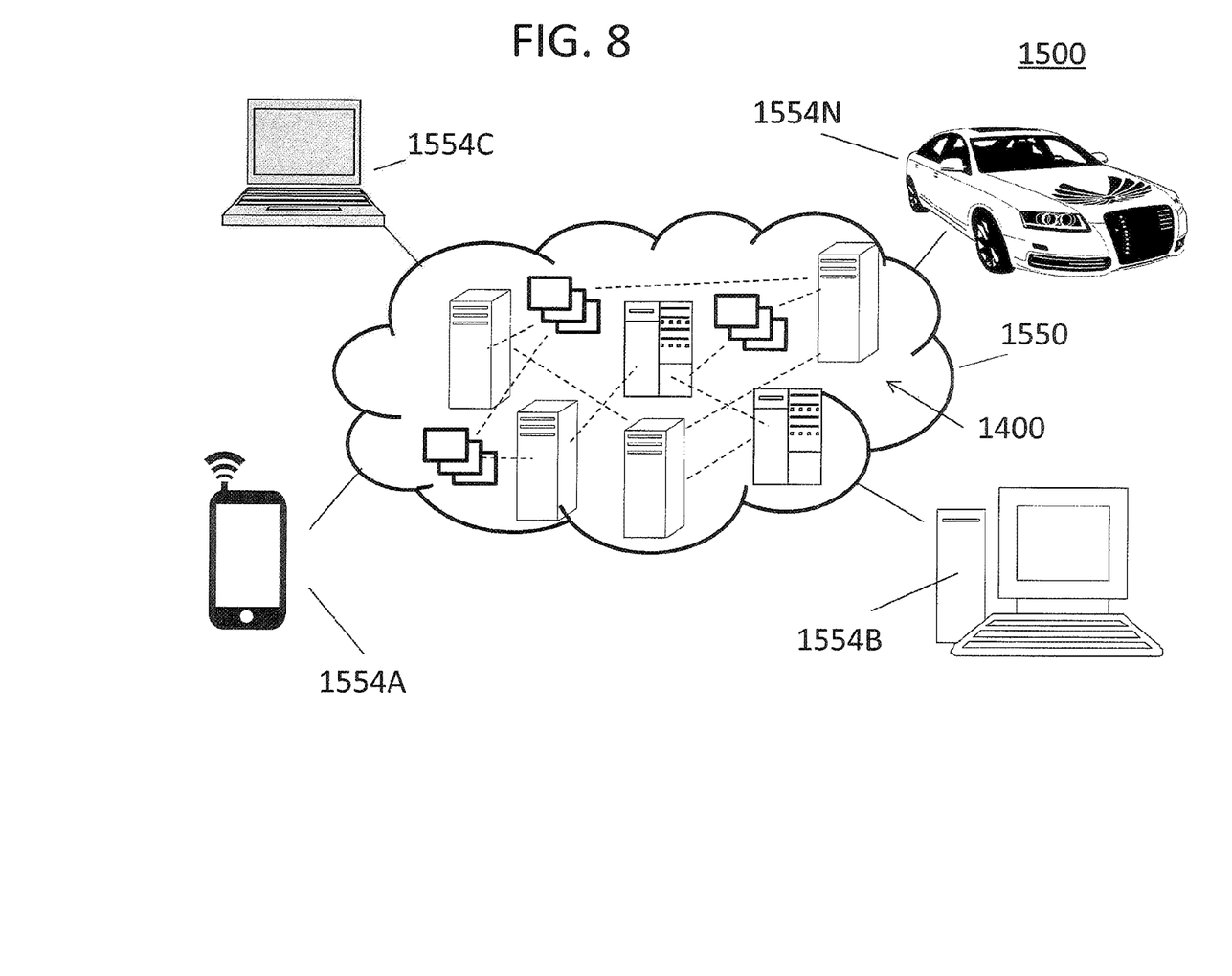
FIG. 8 depicts a cloud computing environment according to an embodiment of the present invention.

Referring now to FIG. 8, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 8 are intended to be illustrative only and that computing nodes 1400 and cloud computing environment 1550 can communicate with any type of computerized device over any type of network and/or network addressable connection (e.g., using a web browser).

Figure 9:
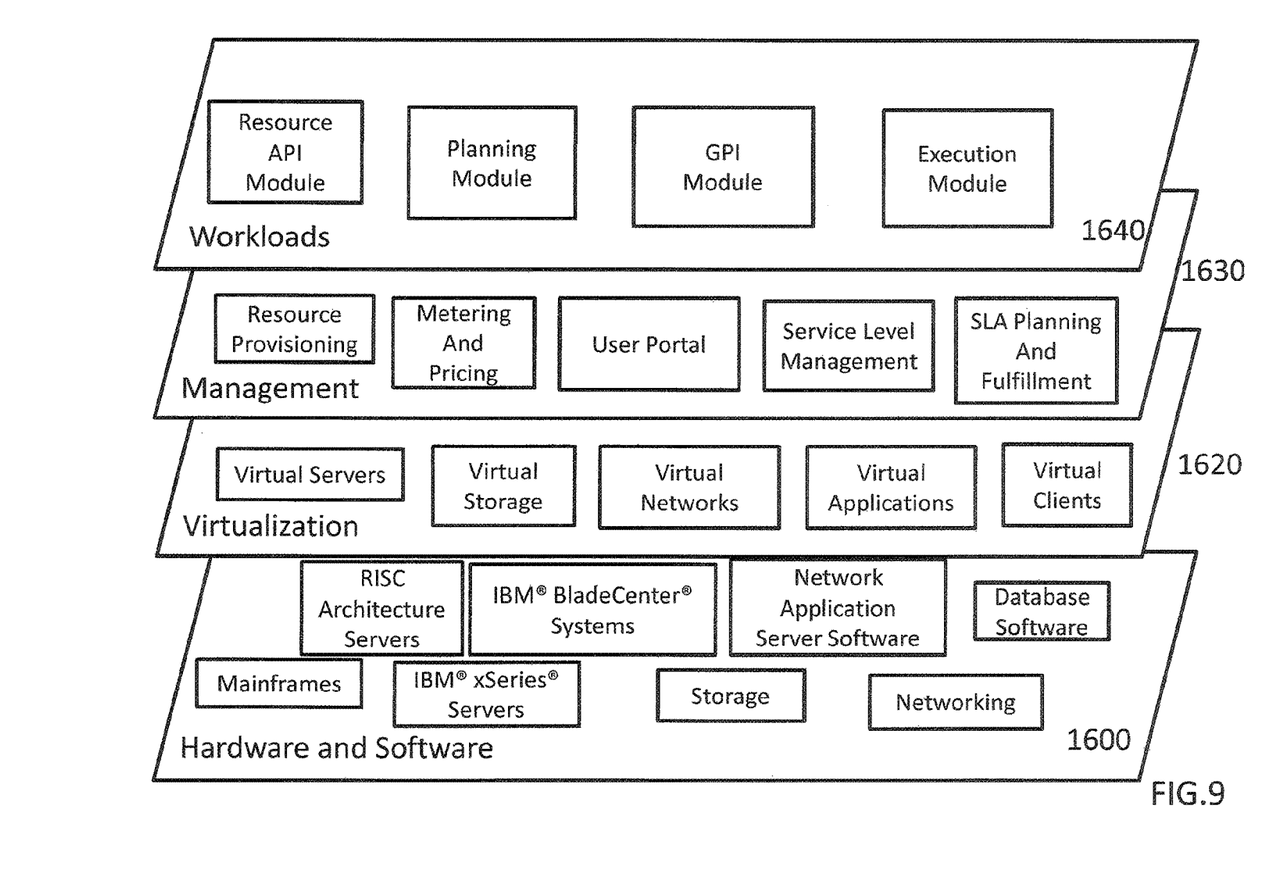
FIG. 9 depicts abstraction model layers according to an embodiment of the present invention.

Referring now to FIG. 9, a set of functional abstraction layers provided by cloud computing environment 1550 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for concealing searches for information stored on public networks, comprising:
   intercepting a sensitive query to a search engine prior to transmission of the sensitive query over a public network;
   transforming the sensitive query into one or more related queries to obscure the sensitive query and search results;
   submitting the related queries over the public network to the search engine to provide the search results that are obscured;
   aggregating and recombining the search results from the search engine; and
   performing a search on the original query with a search engine privately against said search results,
   wherein there are two or more related benign queries made to the search engine, wherein the search results that are obscured are output to a display device, wherein the search engine on the public network is executed on a first computer on the public network, and the performing the search on the original query with the search engine privately against said search results being performed in a private environment.

2. The method according to claim 1, wherein the intercepting the sensitive query is to a plurality of the search engines prior to transmission of the sensitive query over a plurality of the public networks, wherein the submitting of the related queries is over the plurality of the public networks to the plurality of the search engines, and wherein the aggregating of the search results is from the plurality of the search engines.

3. The method according to claim 1, wherein the search results are stored in a computer readable medium, and wherein the obscured search results are aggregated and recombined in a private environment so that the search is performed on the original query inside of a protected system by using a local search engine, wherein the performing the search on the original query with the search engine privately on a private computer against said search results is for concealing searches for information stored on computers in the public networks.

4. The method according to claim 1, wherein the related queries are sent from at least one user who was not the searcher issuing said sensitive query, and the related queries are issued from different users, different IP (Internet Protocol) addresses or at different times.

5. The method according to claim 1, wherein the related queries are issued from different addresses, and wherein an output is displayed on a display device for the search on the original query with the search engine privately against the search results.

6. The method according to claim 1, wherein the user or device issuing the search identifies the search as sensitive, and performing the search on the original query with the search engine privately against said search results to concealing searches for information stored on public networks, wherein the transforming of the sensitive query into one or more related queries to obscure the sensitive query and search results and the submitting the related queries over the public network to the search engine to provide the search results that are obscured are performed by a machine including a memory and a processor.

7. The method according to claim 1, wherein the search is classified as sensitive automatically, and wherein the intercepting, transforming, submitting, aggregating, and performing the search is executed by a processor, wherein the related queries are sent from at least one user who was not the searcher issuing said sensitive query, and the related queries are issued from different users, different IP (Internet Protocol) addresses or at different times.

8. The method according to claim 1 implemented in a cloud computing environment, wherein the related queries are sent from a first source different than a second source issuing said sensitive query, and the related queries are issued from different users, different IP (Internet Protocol) addresses or at different times.

9. A search concealing system, comprising:

a memory;

a processor coupled to the memory; and the memory and the processor configured to perform a method comprising:

intercepting a sensitive query to a search engine prior to transmission of the sensitive query over a public network;

transforming the sensitive query into one or more related queries to obscure the sensitive query and search results;

submitting the related queries over the public network to the search engine to provide the search results that are obscured from the public network;

aggregating and recombining the search results from the search engine; and performing a search on the original query with a search engine privately against said search results, wherein the search results are stored in the memory as a database, wherein the search results that are obscured are output to a display device, wherein the search engine on the public network is executed on a first computer on the public network, and the performing the search on the original query with the search engine privately against said search results being performed in a private environment, and wherein the related queries are sent from a first source different than a second source issuing said sensitive query, and the related queries are issued from different users, different IP (Internet Protocol) addresses or at different times.

10. The search concealing system according to claim 9, wherein the intercepting the sensitive query is to a plurality of the search engines prior to transmission of the sensitive query over a plurality of the public networks, wherein the submitting of the related queries is over the plurality of the public networks to the plurality of the search engines, and wherein the aggregating of the search results is from the plurality of the search engines.

11. The search concealing system according to claim 9, wherein there are two or more related benign queries made to the search engine, and wherein the related queries are sent from at least one user who was not the searcher issuing said sensitive query.

12. The search concealing system according to claim 9, wherein the related queries are issued from different addresses, and wherein a machine includes the processor and the memory.

13. The search concealing system according to claim 9, wherein the user issuing the search identifies the search as sensitive, and wherein the search is classified as sensitive automatically.

14. The search concealing system according to claim 9 is implemented in a cloud computing environment.

15. A computer program product comprising a computer readable storage medium having program instructions embodied therewith, the program instructions readable and executable by a computer to cause the computer to:

intercepting a sensitive query to a search engine prior to transmission of the sensitive query over a public network;

transforming the sensitive query into one or more related queries to obscure the sensitive query and search results;

submitting the related queries over the public network to the search engine to provide the search results that are obscured;

aggregating and recombining the search results from the search engine; and performing a search on the original query with a search engine privately against said search results, wherein the computer program product is executed in a cloud computing environment, wherein the search results that are obscured are output to a display device, wherein the search engine on the public network is executed on a first computer on the public network, and the performing the search on the original query with the search engine privately against said search results being performed in a private environment, and wherein the related queries are sent from a first source different than a second source issuing said sensitive query, and the related queries are issued from different users, different IP (Internet Protocol) addresses or at different times.

16. The computer program product according to claim 15, wherein the computer readable storage medium is non-transitory and executed on a machine including the computer, wherein the search results are stored in the computer readable storage medium, wherein there are two or more related benign queries made to the search engine, wherein the related queries are sent from at least one user who was not the searcher issuing said sensitive query, wherein the related queries are issued from different addresses, wherein the user issuing the search identifies the search as sensitive, and wherein the search is classified as sensitive automatically.

* * * * *